US 6,693,442 B2

(12) United States Patent
Karray et al.

(10) Patent No.: US 6,693,442 B2
(45) Date of Patent: Feb. 17, 2004

(54) VEHICLE OCCUPANT PROXIMITY SENSOR

(75) Inventors: Fakhreddine Karray, Waterloo (CA); Vladimir Filippov, Kitchener (CA); Otman Adam Basir, Kitchener (CA)

(73) Assignee: Intelligent Mechantronic Systems, Inc., Waterloo (CA)

( * ) Notice: Subject to any disclaimer, the term of this patent is extended or adjusted under 35 U.S.C. 154(b) by 0 days.

(21) Appl. No.: 10/368,329

(22) Filed: Feb. 18, 2003

(65) Prior Publication Data

US 2003/0122554 A1 Jul. 3, 2003

Related U.S. Application Data

(63) Continuation of application No. 09/872,873, filed on Jun. 1, 2001, now Pat. No. 6,552,550.
(60) Provisional application No. 60/236,848, filed on Sep. 29, 2000.

(51) Int. Cl.⁷ .............................................. G01R 27/26
(52) U.S. Cl. ........................................................ 324/662
(58) Field of Search ............................... 324/662, 661, 324/671; 180/271, 272; 701/45, 46, 47; 340/438, 436

(56) References Cited

U.S. PATENT DOCUMENTS

| | | |
|---|---|---|
| 3,740,567 A | 6/1973 | Atkins |
| 3,898,472 A | 8/1975 | Long |
| 3,943,376 A | 3/1976 | Long |
| 4,300,116 A | 11/1981 | Stahovec |
| 4,796,013 A | 1/1989 | Yasuda et al. |
| 4,831,279 A | 5/1989 | Ingraham |
| 4,980,519 A | 12/1990 | Mathews |
| 5,118,134 A | 6/1992 | Mattes et al. |
| 5,166,679 A | 11/1992 | Vranish et al. |
| 5,214,388 A | 5/1993 | Vranish et al. |
| 5,247,261 A | 9/1993 | Gershenfeld |
| 5,330,226 A | 7/1994 | Gentry et al. |
| 5,411,289 A | 5/1995 | Smith et al. |
| 5,439,249 A | 8/1995 | Steffens, Jr. et al. |
| 5,525,843 A | 6/1996 | Howing |
| 5,602,734 A | 2/1997 | Kithil |
| 5,691,693 A | 11/1997 | Kithil |
| 5,722,686 A | 3/1998 | Blackburn et al. |
| 5,724,024 A | 3/1998 | Sonderegger et al. |
| 5,770,997 A | 6/1998 | Kleinberg et al. |
| 5,802,479 A | 9/1998 | Kithil et al. |
| 5,844,486 A | 12/1998 | Kithil et al. |
| 5,948,031 A | 9/1999 | Jinno et al. |
| 5,954,360 A | 9/1999 | Griggs et al. |
| 6,007,095 A | 12/1999 | Stanley |
| 6,014,602 A | 1/2000 | Kithil et al. |
| 6,020,812 A | 2/2000 | Thompson et al. |
| 6,043,743 A | 3/2000 | Saito et al. |
| 6,079,738 A | 6/2000 | Lotito et al. |
| 6,088,640 A | 7/2000 | Breed |
| 6,094,610 A | 7/2000 | Steffens, Jr. et al. |
| 6,104,972 A | 8/2000 | Miyamoto et al. |
| 6,254,127 B1 | 7/2001 | Breed et al. |
| 6,283,504 B1 | 9/2001 | Stanley et al. |
| 6,302,438 B1 | 10/2001 | Stopper, Jr. et al. |
| 6,392,542 B1 | 5/2002 | Stanley |
| 6,422,595 B1 | 7/2002 | Breed et al. |

FOREIGN PATENT DOCUMENTS

| | | |
|---|---|---|
| EP | 08857823 A1 | 12/1998 |
| WO | WO 97/39920 | 10/1997 |

*Primary Examiner*—N. Le
*Assistant Examiner*—Amy He
(74) *Attorney, Agent, or Firm*—Carlson, Gaskey & Olds

(57) ABSTRACT

A vehicle occupant proximity sensor includes a transmitting electrode in a vehicle seat and an array of receiving electrodes mounted in a vehicle headliner above the vehicle seat. The sensor determines the capacitance at each of the receiving electrodes, which varies based upon the proximity of the occupant to each receiving electrode, thus producing an array of proximity information indicating in two dimensions the position of the occupant.

17 Claims, 1 Drawing Sheet

VEHICLE OCCUPANT PROXIMITY SENSOR

This application is a continuation of U.S. Ser. No. 09/872,873 filed Jun. 1, 2001, now U.S. Pat. No. 6,552,550, which claims priority to U.S. Provisional Ser. No. 60/236,848 filed Sep. 29, 2000.

BACKGROUND OF THE INVENTION

The present invention relates to a vehicle occupant safety systems, and more particularly, to a vehicle occupant proximity sensor for use with a vehicle occupant safety system.

Vehicle occupant safety systems that are activated in response to a vehicle crash for purpose of mitigating occupant injury are well known in the art. A vehicle may contain automatic safety restraint actuators such as front and side air bags, seat belt pretensioners, and deployable knee bolsters. The occupant protection system may further include a collision/crash sensor for sensing the occurrence of a vehicle crash and for providing an electrical signal indicative of the crash severity.

Several known occupant protection systems include an occupant position sensor that senses the position of the occupant with respect to an associated inflatable protection module. The occupant position sensor for such a system could be an ultrasonic sensor, an infrared sensor, and a capacitive sensor, and/or a weight sensor. A controller, which is connected to the sensors, controls the inflatable protection module in response to the sensed position of the occupant. In response to the sensed occupant position, one or more deployment aspects of the air bag may be adjusted. A protection system with adjustable aspects of deployment is commonly referred to as an "adaptive" protection system. Specifically, if the occupant is positioned in a position such that deploying the air bag will not enhance protection of the occupant, it may be desirable to suppress actuation of the occupant protection module. An occupant who is very near the protection module is referred to as being within an occupant out-of-position zone. Deploying the air bag for an occupant who is within the occupant out-of-position zone may not enhance protection of the occupant.

In any case the determination of occupant's position is an important part of adaptive occupant protection system. There are several types of proximity sensors, such as ultrasonic sensor, a video sensor, a capacitive sensor, and an infrared sensor. Different obstacles such as a map, a book, or a newspaper could occlude signals from ultrasonic and video sensors. A lighter or cigarette could blind an infrared sensor. Existing capacitive sensors rely on the strength of the electric field to determine proximity (i.e. dash mounted capacitive sensor). This makes the sensor susceptible to being fooled if the strength of the electric field is blocked. A system that relies on the strength of the electric field may be inaccurate if a portion of the signal is lost. Furthermore, existing sensors are also complex and expensive.

This invention is based on a simple fact—the physical properties of the human body do not change rapidly. For example, the conductivity of the human body tends to be constant and hence it can be used to measure the distance between the occupant and the corresponding protection module through the use of a capacitive sensor.

SUMMARY OF THE INVENTION

The present invention provides an occupant proximity sensor utilizing an occupant's conductivity to determine proximity by measuring the capacitance between the occupant's head and roof-mounted array of sensors (electrodes). A transmitting electrode is mounted in a vehicle seat. An array of receiving electrodes is mounted to the ceiling of the vehicle above the occupant's seat. A control unit serially switches these receiving electrodes to create a profile of the produced electric field. Desired precision is achieved by counting the proximity for each element in the array. The resulting data indicates in two dimensions the accurate position of the occupant in the passenger compartment. The control unit utilizes an excitation method and a synchronous detection method to measure capacitance. It uses micro power low frequency signal that is safe for human.

BRIEF DESCRIPTION OF THE DRAWINGS

Other advantages of the present invention will be readily appreciated as the same becomes better understood by reference to the following detailed description when considered in connection with the accompanying drawings wherein:

The FIGURE illustrates the vehicle occupant proximity sensor installed in a vehicle passenger compartment with an occupant safety system.

DETAILED DESCRIPTION OF A PREFERRED EMBODIMENT

Figure 1:
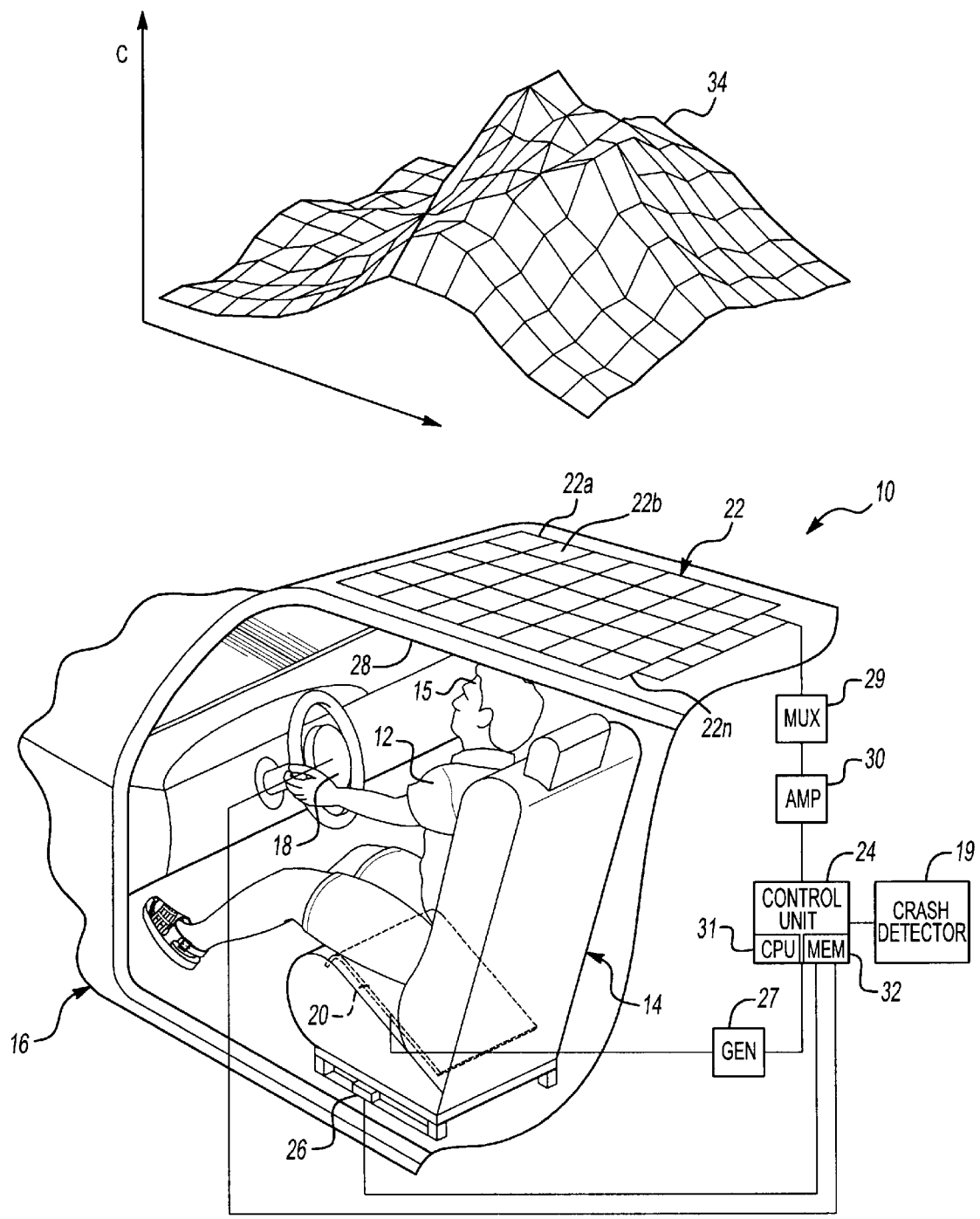

The FIGURE illustrates a vehicle occupant proximity sensor 10 for determining the position of an occupant 12 in a vehicle seat 14, and more particularly, for determining the position of the occupant's head 15. The occupant 12 and vehicle seat 14 are installed in a vehicle passenger compartment 16 having an occupant safety system, including an automatic safety restraint, such as an airbag 18. Although a steering wheel mounted airbag 18 is illustrated as an example, it should also be understood that the present invention is also useful for side airbags, seatbelt pretensioners, deployable knee bolsters, and any other automatic safety restraint actuators. Crash detector 19, such as a crash sensor of any known type, is used to determine the occurrence of a vehicle crash and to determine the crash severity.

The vehicle occupant proximity sensor 10 comprises a transmitting electrode 20 generating an electromagnetic signal and a receiving electrode array 22 comprising a plurality of receiving electrodes 22a–n arranged in an array, for receiving the electromagnetic signal generated by the transmitting electrode 20. A control unit 24 receives electrical signals from the receiving electrode array 22 based upon the electromagnetic signal received by the electrode array 22. The control unit 24 also receives a signal from seat track position sensor 26 indicating the position of the vehicle seat 14 on a vehicle track (not shown) in the passenger compartment 16.

The transmitting electrode 20 is mounted in the base of vehicle seat 14. The transmitting electrode 20 may comprise a coil of wire or a copper sheet and can be made from any conductive material, but preferably comprises a mesh of copper wires approximately one inch apart. Generally, it is preferred to cover a large area of the base of the seat 14 with the transmitting electrode 20 and to wrap the transmitting electrode around the front of the seat. It should be insured that the transmitting electrode is not shorted to ground via the frame of the vehicle. A frequency generator 27 generates a 10 KHz signal to the transmitting electrode 20, which is then transmitted as an electromagnetic signal in the passenger compartment 16.

The receiving electrode array 22 is mounted in the vehicle headliner 28 in the passenger compartment 16 above the occupant 12. The receiving electrodes 22a–n each comprise a small conductive surface, preferably a 6.5 cm by 9 cm piece of printed circuit board. The receiving electrode array 22 is connected to the control unit 24 via a multiplexer 29 and amplifier 30. Again, it must be insured that none of the receiving electrodes 22a–n are shorted to ground via the frame. The multiplexer 29 enables the control unit 24 to sequentially read values from the receiving electrodes 22 to determine the position of the occupant 12.

The control unit 24 generally comprises a CPU 31 having memory 32. The CPU 31 is suitably programmed to perform the functions described herein and any person of ordinary skill in the art could program the CPU 31 accordingly and supply any additional hardware not shown but needed to implement the present invention based upon the description herein.

In operation, the control unit 24 controls generator 27 to generate a 10 KHz signal to the transmitting electrode 20. The transmitting electrode 20 transmits a 10 KHz signal as an electromagnetic wave inside the vehicle passenger compartment 16. The electromagnetic signal passes through occupant 12 and is received by a receiving electrode array 22. The signal received by each receiving electrode 22a–n is based upon the capacitance between it and the transmitting electrode 22, which in turn will vary depending upon the proximity of the occupant 12 to each receiving electrode 22a–n.

The receiving electrode array 22 may be one-dimensional, thus indicating only the distance of the occupant 12 from the airbag 18 along the longitudinal axis of the vehicle. However, the electrode array 22 is preferably two-dimensional as shown in the FIGURE, thus providing information regarding the position of the occupant 12 in two dimensions in the vehicle passenger compartment 16, namely, along the longitudinal and lateral axes of the vehicle. The lateral position information can be used to determine whether to activate side air bags or the force for deployment of the side air bags, or can also be used for activation of the steering wheel mounted air bag 18. The size and resolution of the receiving electrode array 22 may vary for different applications and different vehicles; however, for one application the receiving electrode array 22 is preferably 8×8.

The control unit 24 controls multiplexer 29 to sequentially read each of the receiving electrodes 22a–n. Although performed sequentially, it is performed sufficiently quickly relative to normal motion of a vehicle occupant 12 to provide what is effectively an instantaneous two-dimensional snapshot of the position of the occupant 12 in the passenger compartment 16.

The values read by control unit 24 are represented graphically as a three-dimensional graph 34 in the FIGURE. As can be seen in FIG. 1, the capacitance at each receiving electrode 22a–n depends on the proximity of the occupant 12 to each receiving electrode 22a–n. Thus, the highest capacitance will be measured at the receiving electrode closest to head 15 of the vehicle occupant 12. Since the vehicle occupant proximity sensor 10 of the present invention provides an array of proximity values, this array of information can be processed as an image, as can be seen in the graph 34. The position of the occupant's head 15, and to some extent, the position of the occupant's shoulders can be discerned from the graph 34 by the control unit 24.

It should be noted that in determining the position of the head 15 of the occupant 12, the values from each receiving electrode 22a–n are compared to each other, rather than evaluating their absolute values. Therefore, the information from the receiving electrode array 22 is preferably processed as an image, using known image processing techniques. Further, the control unit 24 monitors the information from the receiving electrode array 22 over time. For example, the position of the head 15 of occupant 12 cannot change instantaneously; it must follow a path from one point to another. The control unit 24 may additionally use the magnitude of the sensor signals to determine the height of occupant 12 (but, again, preferably not for determining the position of occupant 12). The control unit 24 may additionally take information from the vehicle seat track sensor 26, which indicates the position of the vehicle seat 14 on a vehicle seat track.

All of this information is utilized by control unit 24 to determine whether to deploy the airbag 18 (or other safety restraint device) based upon a crash detected by crash detector 19 and the severity of a crash. For example, if the control unit 24 determines, based upon information from receiving electrode array 22, that the occupant 12 is too close to airbag 18, the control unit 24 may determine not to activate airbag 18 in the event of a crash, or the control unit 24 may determine that airbag 18 should be deployed with less force. On the other hand, if occupant 12 control unit 24 determines based upon information from receiving electrode array 22 that occupant is at a distance from airbag 18 in excess of a predetermined threshold, the control unit 24 will cause airbag 18 to deploy, or will cause airbag 18 to deploy with higher force, depending upon the severity of the crash as determined by crash detector 19.

Additionally, information from seat track sensor 26 may be utilized with the proximity information to determine whether and/or how airbag 18 should be deployed. For example, if seat track sensor 26 indicates that the vehicle seat 14 is adjusted forward in the vehicle passenger compartment 16, and the receiving electrode array 22 indicates that the occupant 12 is also forward, the control unit 24 may determine not to deploy airbag 18 in the event of a crash. On the other hand, if the seat track position sensor indicates that the vehicle seat 14 is too far forward, the control unit 24 may decide not to deploy airbag 18, even though the receiving electrode array 22 indicates that the head 15 of the occupant 12 is sufficiently rearward for deployment. This would occur in the event that the occupant 12 has the vehicle seat 14 reclined significantly. Further, the control unit 24 may determine that if the head 15 of the occupant 12 is sufficiently rearward, the airbag 18 may be deployed in the event of a crash even though the vehicle seat track position sensor 26 indicates that the vehicle seat 14 is too far forward. This would indicate that the occupant 12 again has the vehicle seat 14 reclined significantly and sufficiently that the airbag 18 should be deployed. Generally, those of ordinary skill in the art will program control unit 24 utilizing the above and many additional rules for whether to fire airbag 18, and for a multiple stage airbag 18, how much force airbag 18 should be deployed. The present invention provides additional information to the control unit 24, such that those of ordinary skill in the art could take in this additional information to properly determine whether and with how much force to activate airbag 18.

As explained above, the information from receiving electrode array 22 is preferably processed as an image and is monitored over time. For example, the position of the head 15 of occupant 12 cannot change instantaneously. This principal is utilized to properly handle the situation where the occupant 12 may touch the headliner 28 with his hand. In this case, the position of the head 15 will have been identified by the control unit 24 over time and the hand of occupant 12 touching the headliner 28 will appear as a sharp, sudden spike. By tracking the position of the head 15 of occupant 12 over time, the control unit 24 will properly ignore the sharp, sudden spike from the occupant's hand, since the head 15 of the occupant 12 cannot move instantaneously. Further, since the hand of the occupant 12 will have less mass than the head 15 of the occupant 12, the shape of the spike will be sharper than that of the shape of the signal from the head 15, thus also assisting the control unit 24 in distinguishing a hand from a head. This is true even though the signal may be strongest at the receiving electrode 22a (for example) directly above where the occupant 12 touches the headliner 28.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A method for activating a vehicle occupant safety system including the steps of:
   a. Measuring capacitance at each of a plurality of points in a vehicle passenger compartment having an occupant safety system;
   b. Determining a position of an occupant relative to the safety system based upon said step a;
   c. Monitoring a change in position of the occupant over time based upon said step b;
   d. Ignoring an apparent instantaneous position of the occupant if it is inconsistent with the monitored change in position over time as determined in said step c); and
   e. Determining whether to activate the vehicle occupant safety system based upon said steps b and d.

2. The method of claim 1 wherein said step a. further includes the step of transmitting an electromagnetic signal from a vehicle seat in the vehicle passenger compartment.

3. The method of claim 2 wherein said step a. further includes the step or measuring capacitance based upon the electromagnetic signal received at the plurality of points.

4. The method of claim wherein said step a. further includes the step of measuring capacitance at an array of the plurality of points.

5. The method of claim 4 wherein said step a. further includes the step of comparing the capacitance measured at each of the plurality of points with each other.

6. The method of claim 5 wherein the plurality of points are adjacent a headliner in the vehicle passenger compartment.

7. The method of claim 1 wherein said step d. further includes the step of:
   f. determining that the apparent instantaneous position is a hand of the occupant and not the head of the occupant, and wherein said step d. is further based upon said step f.

8. The method of claim wherein said step f. includes the step of determining a shape of a measurement of the apparent instantaneous occupant position and wherein said step d. further is based upon the shape.

9. A vehicle passenger compartment proximity sensing system comprising:
   A first electrode mounted in a vehicle seat and generating an electromagnetic signal;
   A plurality of second electrodes mounted adjacent a vehicle headliner in the vehicle passenger compartment and receiving the electromagnetic signal to measure capacitance at a plurality of points in a passenger compartment;
   A controller determining a position of an occupant based upon the capacitance measured at the plurality of points.

10. The vehicle passenger compartment proximity sensing system of claim 9 wherein the plurality of second electrodes are arranged in a two-dimensional array.

11. The vehicle passenger compartment proximity sensing system of claim 9 further including a scat track position sensor determining a position of the vehicle seat on a seat track, the controller determining whether to deploy an active restraint based upon information position of the occupant and based upon the position of the vehicle seat.

12. A computer readable medium storing a program which when executed by a computer performs the steps of:
   a) receiving proximity information from a plurality of sensors mounted generally in a plane in a headliner in a vehicle;
   b) comparing the proximity information from each of the plurality of sensors to one another and determining relative distances from an occupant to each of the sensors;
   c) determining a position of an occupant in the vehicle relative to at least one dimension parallel to the plane; and
   d) determining whether the deploy an air bag based upon said step c).

13. A vehicle passenger compartment proximity sensing system comprising:
   A plurality of capacitive sensors arranged generally adjacent a headliner of the vehicle and arranged to measure capacitance at a plurality of points in a passenger compartment; and
   A controller comparing the capacitance measured by each of the plurality of sensors to one another and determining a position of an occupant based upon the relative capacitance measured at the plurality of points by determining the position of a head of the occupant to be nearest one of the plurality of sensors indicating the closest proximity to the other sensors.

14. A method for activating a vehicle occupant safety system including the steps of:
   a. Transmitting an electromagnetic signal from an electrode in a vehicle seat to a plurality of points arranged generally in a plane adjacent a headliner in the vehicle;
   b. Determining a position of a head of the occupant relative to the safety system based upon said step a.; and
   c. Determining whether to activate the vehicle occupant safety system based upon said step b.

15. The method of claim 14 wherein said step b. further includes the step of measuring capacitance due to the position of the head.

16. The method of claim 15 wherein said step b. further includes the step of measuring capacitance at each of a plurality of points to determine the position of the head in said step b.

17. The method of claim 14 further including the step of:
   d. determining the position of the head in said step b. for each of a plurality of sequential dines;
   e. analyzing the position of the head over lime based upon said step d.; and
   f. performing said step c. based upon said step e. over time.

* * * * *

UNITED STATES PATENT AND TRADEMARK OFFICE
CERTIFICATE OF CORRECTION

PATENT NO. : 6,693,442 B2
DATED : February 17, 2004
INVENTOR(S) : Karray et al.

It is certified that error appears in the above-identified patent and that said Letters Patent is hereby corrected as shown below:

<u>Column 5,</u>
Line 42, please insert -- 3 -- after "claim" and before "wherein".
Line 57, please insert -- 7 -- after "claim" and before "wherein".

<u>Column 6,</u>
Line 10, "scat" should read as -- seat --.
Line 61, "dines" should read as -- times --.
Line 62, "lime" should read as -- time --.

Signed and Sealed this

Eighth Day of June, 2004

JON W. DUDAS
*Acting Director of the United States Patent and Trademark Office*